2 Sheets—Sheet 1.

G. R. INGALLS.
Milk-Cooler.

No. 206,792.     Patented Aug. 6, 1878.

Witnesses.
                              Inventor.
                              George R. Ingalls
                              per Edson Bro's.
                              Attorneys G. R. INGALLS.
Milk-Cooler.
No. 206,792. Patented Aug. 6, 1878.
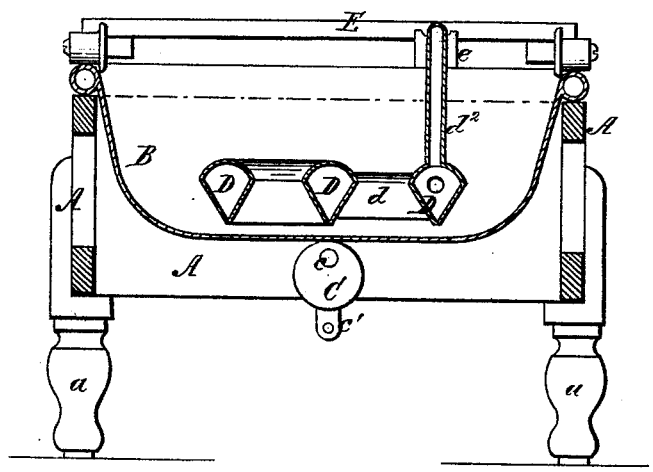
Fig. 3
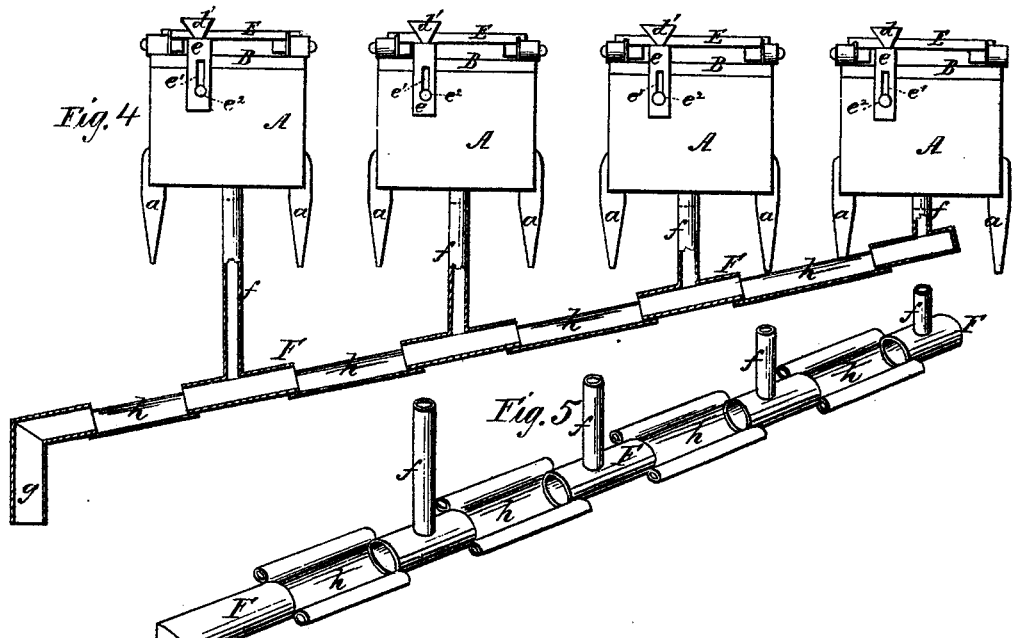
Fig. 4
Fig. 5
Witnesses.
Inventor:
George R. Ingalls
per Edson Bros.
Attorneys

UNITED STATES PATENT OFFICE.

GEORGE R. INGALLS, OF ABERCORN, QUEBEC, CANADA.

IMPROVEMENT IN MILK-COOLERS.

Specification forming part of Letters Patent No. 206,792, dated August 6, 1878; application filed April 6, 1878.

*To all whom it may concern:*

Be it known that I, GEORGE R. INGALLS, of Abercorn, in the county of Brown and Province of Quebec, Canada, have invented certain new and useful Improvements in Milk-Coolers; and I do hereby declare that the following is a full, clear, and exact description thereof, which will enable others skilled in the art to which it appertains to make and use the same, reference being had to the accompanying drawings, and to letters of reference marked thereon, which form a part of this specification, and in which—

Figure 1:
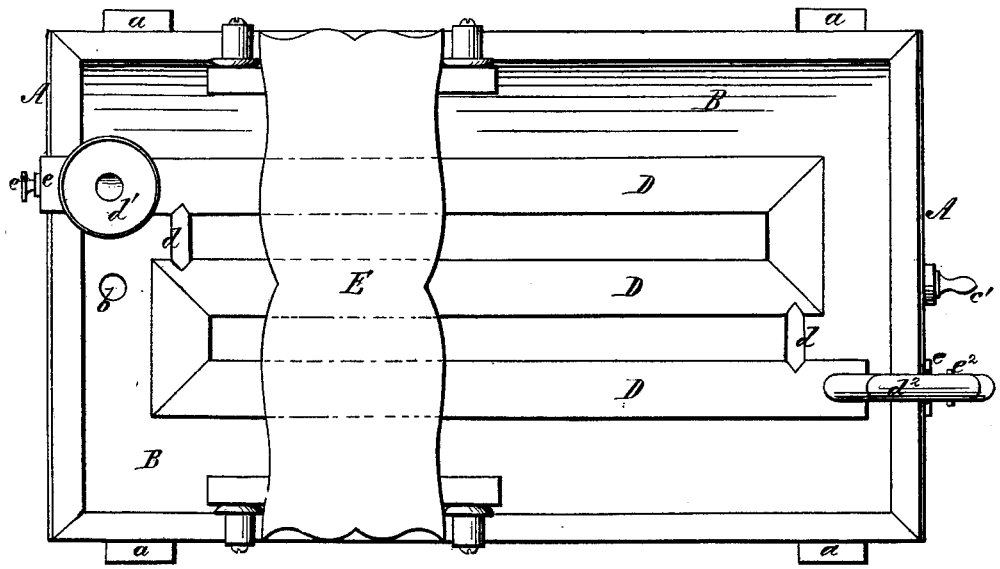
Figure 2:
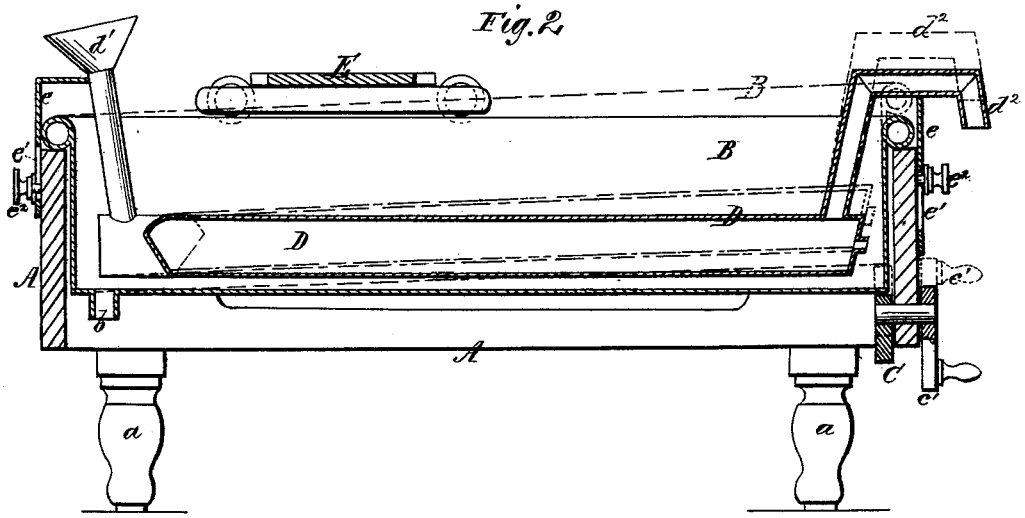

Figure 1 is a plan view of my improved milk-cooler. Fig. 2 is a vertical longitudinal section. Fig. 3 is a transverse section of my improvement. Fig. 4 is an end view of a number of vats or pans with one feature of my improvement applied thereto, and Fig. 5 is a perspective view of the latter-mentioned feature.

Corresponding parts in the several figures are denoted by like letters.

This invention appertains to certain improvements in milk-coolers; and it consists in the combination, with a series of milk-vats, of peculiarly-constructed milk-discharging devices, as hereinafter more fully described and claimed.

In the annexed drawing, A refers to a frame, supported upon legs $a$ $a$, and inclosing and supporting a pan or vat, B, provided around its upper edges with flanges resting upon said support or frame and with an outlet, $b$. C is a cam arranged beneath one end of the pan or vat B, and eccentrically attached to a shaft or axis, C, bearing in the support A, and provided with a crank or handle, $c'$, by which it may be operated so as to elevate that end of the pan, and thus tilt or incline the latter, in order to pass off all its contents upon emptying the pan. It will be also seen that by tilting the pan the bottom of the pan will be lifted at one end nearer the cooling-pipes, and thus further cool the milk near its bottom.

D D refer to the cooling-pipes, communicating with each other by the transverse connecting-pipes $d$ $d$, and provided with the funnel $d^1$, through which they may be filled with the cooling agent or water, and the overflow pipe or elbow $d^2$. By means of these two latter-described devices and brackets or supports $e$ $e$, attached to the frame A, the cooling-pipes D are supported in the pan B in a slightly elevated position.

The supports or brackets $e$ $e$ are provided with slots $e^1$ $e^1$, which receive adjusting-screws $e^2$ $e^2$, entering the frame A, to permit of the vertical adjustment of said brackets and the milk-pan.

E is a truck mounted upon the vat or pan B, upon which to place the cans to permit of transporting the same to different parts of the vat. F is a device or trough for discharging the cooled milk from the pan B, having a series of branch pipes, $f$ $f$, made preferably each succeeding one longer than the preceding one.

This device is adapted for one to four milk pans or vats, each branch pipe $f$ being adjusted to an outlet, $b$, as supplied to the vat or pan B.

The object of increasing the length of the pipes $f$ $f$ is to enable the said pipes of the trough or device F (to be placed in an inclined position to properly discharge the milk) to conform to the increasing distances between the vats and the inclined trough or device F.

The trough F is provided with a discharging-pipe, $g$, and is left open, as at $h$ $h$, to permit of access thereto, by which it may be readily cleaned, &c.

I am aware that it is not new to connect a detachable and sliding trough to a milk-vat by means of a swiveled tube and a coupling.

I am also aware that it is not new, broadly, to connect a series of milk-coolers to a single trough or conductor by means of funnels peculiarly constructed.

Having thus described my invention, what I claim, and desire to secure by Letters Patent, is—

1. The combination, with the pipes F, provided with branch pipes $f$, of the open sections $h$, substantially as shown and described.

2. The pipes F, provided with branch pipes $f$ of increasing lengths, with the open sections $h$ and a series of milk-vats, B, substantially as shown and described.

In testimony that I claim the foregoing as my own I hereunto affix my signature in the presence of two witnesses.

GEORGE REX INGALLS.

Witnesses:
   GEO. C. DYER,
   EUGENE A. DYER.